(12) United States Patent
Pickelsimer et al.

(10) Patent No.: US 6,434,217 B1
(45) Date of Patent: Aug. 13, 2002

(54) SYSTEM AND METHOD FOR ANALYZING LAYERS USING X-RAY TRANSMISSION

(75) Inventors: Bruce L. Pickelsimer, Pflugerville; Tim Z. Hossain, Austin, both of TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 09/685,220

(22) Filed: Oct. 10, 2000

(51) Int. Cl.[7] .............................................. G01B 15/02
(52) U.S. Cl. ........................................... 378/89; 378/90
(58) Field of Search ............................. 378/51, 53, 54, 378/55, 56, 86, 88, 89, 90

(56) References Cited

U.S. PATENT DOCUMENTS 5,418,830 A * 5/1995 Florent ........................ 378/54

FOREIGN PATENT DOCUMENTS

| JP | 61010749 A | * | 1/1986 | ................... 378/89 |
| JP | 06027053 A | * | 2/1994 | ................... 378/89 |

* cited by examiner

*Primary Examiner*—David P. Porta
(74) *Attorney, Agent, or Firm*—Kevin L. Daffer; Conley, Rose & Tayon P.C.

(57) ABSTRACT

A system and method are presented for determining the thickness and elemental composition of a layer within a measurement sample in an easy and inexpensive manner. An embodiment of the method includes impinging an incident x-ray beam into an exposed surface of a measurement sample containing one or more layers. The incident x-ray beam passes through the sample and may refract depending on the composition of the layers to produce a transmitted x-ray beam. The intensity and the angle of refraction of the transmitted x-ray beam may then be measured. These measurements may be compared to the results of a calibration sample that has been prepared with a known thickness and composition relative to the layer characteristics of the sample. The intensity of the transmitted x-ray beam is a function of the thickness of the layer; while the angle of refraction is a function of the elemental composition of the layer. An embodiment of the system includes an x-ray source to produce an incident x-ray beam and a detector to collect a transmitted x-ray beam. The detector is preferably positioned on the side opposite of the exposed surface of the sample on which the incident x-ray beam is impinged. In an alternative embodiment, the system may include a stage on which to place the measurement sample. The process described herein may be used for semiconductor wafers on which a thin film has been applied. The system may be suitable for use in a semiconductor fabrication environment, allowing increased production efficiency and improved process control. Furthermore, thin films of various compositions and thicknesses may be measured, including those of low and high atomic numbers.

22 Claims, 2 Drawing Sheets

SYSTEM AND METHOD FOR ANALYZING LAYERS USING X-RAY TRANSMISSION

BACKGROUND OF THE INVENTION

1. Field of the Invention

This disclosure relates to determining material properties, and more particularly to a system and method for determining thickness and composition of layers.

2. Description of the Related Art

Characteristic analysis of layers within measurement samples is desirable for many applications. For example, the amount and type of adhesive applied to a tape product or the amount and type of metal or paint applied to a device for corrosion protection is critical for functionality of the products. Often, the most important characteristics of the layer include thickness, composition and uniformity. The method and system as described herein are discussed primarily with respect to the analysis of thin films within semiconductor devices. The term "thin film" is commonly used within the semiconductor industry when referring to layers deposited upon a semiconductor wafer during the fabrication of a transistor.

As production volumes and efforts to improve process control increase in the integrated circuit fabrication industry, the ability to accurately characterize semiconductor processes and the materials associated with such processes in a timely manner becomes more critical. Inaccurate analysis of one or more process parameters within the processing of a semiconductor wafer may hinder or prohibit the function of a transistor, leading to a reduction in production efficiency and transistor quality. The characterization of thin films is especially important, since the effectiveness and reliability of thin films play an important, central role in the operation of a transistor. Therefore, thin films must be accurately analyzed in order to meet a transistor's functionality requirements. Unfortunately, many current analysis techniques employ complex, expensive systems that do not coincide with the desire to increase production efficiency and improve process control within the semiconductor industry.

In order for a thin film to be effective, it must conform to strict electrical, chemical, and structural requirements. Specialized materials are selected for thin films to perform specific functions of the transistor. These materials may include, but are not limited to, metallic, semiconducting, and dielectric materials or a combination of them. Often thin films are doped with impurities to heighten the effectiveness of the material used. Thus, the composition of the material must be closely monitored to insure the correct material or combination of materials is applied, along with insuring the correct amount of material is applied. Accordingly, the composition, thickness and uniformity of a thin film all play crucial roles in the function of a transistor.

At present, it is difficult to find an analytical technique suitable for use in a semiconductor fabrication area that can characterize in a simple, accurate and cost-effective manner the thickness, uniformity and composition of a thin film. Many current techniques require expensive and large pieces of equipment that are not used within a fabrication area due to size and cleanliness requirements. Several of these techniques actually destroy the sample being measured, thus increasing the manufacturing cost and time requirements. It is nonetheless useful to discuss some of the analytical tools used currently in the semiconductor industry, for these tools do point out some difficulties and shortcomings associated with characterizing thin films.

One of the analytical methods in current use is Secondary Ion Mass Spectroscopy (hereinafter referred to as SIMS). In SIMS, a sample to be studied is bombarded with a primary beam of energetic ions. These ions sputter away ionized particles, or secondary ions, from the surface of the sample. The secondary ions are directed into a mass spectrometer, which identifies the ions as a function of their mass to charge ratio. Continued sputtering dislodges particles and secondary ions located below the surface of the sample. Thus, SIMS has the ability to analyze elements embedded within the sample as a function of sample depth. Therefore, SIMS can be used to measure the amount of material embedded within a thin film.

Although SIMS depth resolution, lateral resolution, and sensitivity continue to improve year after year, several drawbacks are inherent with SIMS measurements. The biggest drawback is the fact that SIMS is a destructive technique. SIMS sputters away layer after layer of material from the surface of the sample; thus, it is not feasible to use SIMS as a bench-top process control station, which could monitor the amount of material embedded within a thin film. Also, SIMS is a very bulky, complex, expensive method requiring complicated, maintenance-intensive machinery. For instance, SIMS instruments typically occupy an entire room in a mid-sized laboratory and consist of several vacuum pumps, valves, powerful magnets, energy filters, ion sources, and complex data analysis tools.

Another technique, which may be used in the semiconductor industry, is Auger electron spectroscopy (hereinafter referred to as AES). In AES, an energetic, primary electron beam is directed at the surface of a sample. The primary electron beam interacts with atoms at and near the surface of the sample, dislodging electrons from energy shells of the sample. As an energy shell is vacated, an electron within a higher energy state may fill the vacant position. The electron filling the once-vacant state releases energy characteristic of the transition in energy levels. This energy then interacts with the atom and ejects an electron of a lower energy state. Such an ejected electron is termed an Auger electron and has energy characteristic of the process, which caused its ejection. Because an ejected Auger electron has an energy characteristic of the energy levels of the atom from which it is ejected, one may determine the composition of the sample being studied by measuring the Auger electrons. Because Auger electrons cannot escape from great depths within the bulk of a sample, AES is considered a surface-sensitive analysis technique. It is commonly used to study materials present at a depth within fifty Angstroms from the sample's surface.

In order to study the composition of a sample deeper below the surface, it is necessary to sputter away atoms from the surface of the sample being studied. Thus, to measure the quantity of materials embedded within a thin film deeper than approximately fifty Angstroms, ion sputtering must often be used. Although providing excellent lateral resolution and possessing the ability to probe very small areas, AES suffers from the same major drawback as does SIMS—when probing beneath the surface of a thin film, sputtering is required which effectively destroys the sample. Also, like SIMS, AES requires expensive, complex machinery, which may become maintenance intensive. A typical AES system consists of vacuum pumps (AES is most effective when carried out at pressures of approximately $10^{-10}$ torr and lower) and an ion beam for sputtering the sample.

Another technique, which may be utilized in microelectronics characterization, is X-ray Photoelectron Spectroscopy (hereinafter referred to as XPS). In this technique, an x-ray beam is directed at a sample, and the interaction of x-ray photons with the atoms of the sample causes the ejection of electrons from the sample. The kinetic energy of the ejected electrons is characteristic of the sample being studied. Like AES, only electrons from the top 1–10 monolayers are emitted from the sample. Thus, XPS is similarly a surface-sensitive technique. Like AES, if XPS is to probe within the thin film, destructive sputtering must be employed. Also, similar to AES, XPS systems are quite complex, expensive, and may become maintenance intensive. A typical system consists of powerful vacuum pumps, an electrostatic energy analyzer, and a complicated data analysis system.

X-ray Emission Spectroscopy (hereinafter referred to as XES) is yet another technique in use in the semiconductor field for the purpose of analyzing thin film parameters. In XES, an electron beam impinges upon a sample, creating electron vacancies. When these vacancies are filled, characteristic x-ray photons may be emitted and correlated with the elemental composition and thickness of the sample being studied. Although a very powerful technique, one major drawback to XES is that x-ray photons as deep as five microns below the surface are sometimes emitted and detected by XES systems, creating a lot of background noise. Furthermore, XES is not necessarily able to distinguish atoms embedded within a thin film from atoms embedded within a silicon substrate. Consequently, XES may not be a reliable method to measure thin films containing multiple elements. For example, XES may not be able to detect the amount of silicon embedded within a thin film of titanium directly above a silicon substrate. In such a case, XES would detect silicon from within the thin titanium film as well as from the silicon substrate.

Another possible technique is X-ray Fluorescence (hereinafter referred to as XRF). In XRF techniques, a beam of primary x-ray photons is directed at the surface of a sample. Atoms within the sample absorb the x-rays and emit secondary x-ray photons with characteristic energy levels. The elemental compositions of materials on and under the surface of the wafer may then be determined from the measured energy levels (or wavelengths) of the emitted secondary x-rays. One drawback to XRF is the presence of background radiation, which limits the sensitivity of the device. Primary x-ray photons may lose energy when scattered by atoms of the target material. Such scattered primary x-ray photons which reach the x-ray detector of an XRF instrument create an unwanted background intensity level which secondary x-ray photons must exceed in order to be discerned. Thus, the smallest amount of an element that may be detected in a sample using an XRF instrument is largely determined by the background intensity level at the energy level (or corresponding wavelength) associated with characteristic secondary xrays emitted by that element.

X-ray Reflectivity is yet another method which may be used for the thickness and compositional analysis of thin films on semiconductor surfaces. Primary x-ray photons are reflected off the surface of a targeted material at an angle that is representative of the surface composition and thickness. Unfortunately, this method is only effective for analysis of the surface film, since the reflectance angle of the x-ray is only representative of the material from which it is reflected. Therefore, surface etch techniques must be employed in an effort to determine thickness and compositional characteristics of layers beneath the upper most layer. These techniques are very time consuming and are destructive in nature, requiring expendable samples. Such tests cannot be routinely performed economically or efficiently.

Another commonly used technique to determine thin film thickness is Scanning Electron Microscopy Cross-Sectional Analysis (hereinafter referred to as SEM). SEM is used on a sample that is sliced at the junction of analysis. A primary electron beam, typically the same electron beam used in conjunction with X-ray Emission Spectroscopy, is then directed at a cross section of a sample, while a photograph is simultaneously taken. Both the photograph and electron beam are used to determine the depths of the exposed layers. As with other techniques described above, this system is inefficient in that it is destructive. Therefore, it is not conducive to a manufacturing environment, in which production efficiency is a high priority.

And still other technique used is called Rutherford Backscattering Spectroscopy (hereinafter referred to as RBS). RBS uses high energy helium ions to bombard the surface and subsurface of a sample. Some ions are backscattered with characteristic energy loss and distance to that of the composition of the thin film. However, there are several disadvantages to this method. Often, the technique is unable to distinguish one element from another and the sensitivity to elements with light atomic weight is poor. Furthermore, the method is unable to measure samples of great depths. Therefore, in order to measure layers far beneath the surface of the sample, the sample must be etched and thus the sample is destroyed. The ion accelerator required is also impractically large, complex, and expensive for use in a semiconductor production environment.

Lastly, one method that allows characterization of thin films within a fabrication area is Picosecond Ultrasonic Laser Sonar (hereinafter referred to as PULSE Technology™). PULSE Technology™ utilizes laser-induced ultrasounds that result in temperature gradients, which are measured by sonar. However, PULSE Technology™ is dependent on several parameters including, for example, density, surface roughness and temperature. As with many systems that are dependent on several parameters, interpretation of results is more complex and typically not as reliable as a system with fewer variables. Therefore, a system employing PULSE Technology™ is often not used due to its complexity and variability in measurements.

It would therefore be advantageous to create a system and a method in which to address the aforementioned disadvantages of thin film analysis techniques. It would further be beneficial to create a system and method that is worthy of being placed within a fabrication area in addition to analyzing the uniformity of the thin film thickness across a surface. The system and method should be suitable for analysis of layers, including elements of both small and large atomic weights.

SUMMARY OF THE INVENTION

The problems outlined above may be in large part addressed by a system and a method for determining the thickness and elemental composition of one or more layers within a sample. The technique and apparatus offer an easy and inexpensive manner in which to analyze the sample. Furthermore, such an analysis is designed to be performed within a semiconductor fabrication environment of the layering application, allowing immediate analysis of the sample. The resulting simplification of the manufacturing process may improve production efficiency and process control capabilities.

The system and method as described herein impinges an incident x-ray beam on an exposed surface of a measurement sample. The sample may consist of a semiconductor wafer or other device with one or more layers. In the application of semiconductor wafers, the layers are typically thin films, which have been applied to a semiconductor substrate. The term, thin film, may refer to the layers applied to a wafer. There may be multiple thin films horizontally and vertically adjacent from each other within a measurement sample. Furthermore, the layers may be deposited or thermally grown. The materials for the thin films are selected for their chemical and physical properties and therefore, the composition and thickness of the thin film plays a vital role in the function of a transistor.

In the system and method as described herein, an incident x-ray beam is directed at an angle relative to an exposed surface of a sample by an x-ray source. The angle may be selected from a wide range of degrees, specifically a range greater than zero degrees and less than ninety degrees. Although the incident x-ray beam may be applied at any angle within the previously prescribed range, shallow angles (i.e. less than five degrees) are often used since they typically produce a larger angle of refraction upon penetration through a sample as compared to an incident x-ray beam applied at a large angle relative to the sample. The larger angle of refraction may allow for a more precise measurement of a parameter relating to the size of the angle of refraction. In addition to the impinging angle, an incident x-ray beam may be directed at a preset intensity. In one embodiment, the preset intensity is a single, constant value. However, another embodiment exposes the sample to a multiple of preset intensities, wherein the preset intensities are either presented individually for a given amount of time or in a continuous manner. Corresponding angles of impingement may also differ as preset intensities change. It is postulated that a plurality of intensities and angles may offer additional information regarding the characteristics of a thin film as compared to an individual preset intensity and angle.

Continuing with the system and method as described here, a portion of the incident x-ray beam passes through the sample and refracts through each layer to produce a transmitted x-ray beam. The angle of refraction through the sample relates to the angle between the transmitted x-ray beam and a line perpendicular to the exposed surface of the sample. The transmitted x-ray beam is then collected by a detector, which is positioned to face the surface of the sample from which the transmitted x-ray beam is emitted. Preferably, this surface is opposite from the exposed surface of the sample on which the incident x-ray beam may be impinged. The detector may comprise a lithium-drifted silicon detector or a sodium iodide silicon detector, but other suitable x-ray detector materials may be used. The main purpose of the detector is to detect the transmitted x-ray beam, so that the intensity and the angle of refraction of the transmitted x-ray beam may be measured. In one embodiment, the detector is adapted to measure the intensity and angle of refraction of the transmitted x-ray beam.

The thickness of the sample may then be determined by comparing the intensity collected by the detector to calibration data associated with a sample of similar thickness to that of the measurement sample, since the intensity of the transmitted x-ray beam is a function of the thickness of the layers within the measurement sample. In another embodiment, the angle of refraction may be compared to calibration data associated with a sample of similar composition to that of the sample being measured. Consequently, the angle of refraction is a function of the elemental composition of the layers. Alternatively, the system and method as described here may be adapted to compare both the collected intensity and angle of refraction of the transmitted x-ray beam to calibration data in order to determine the thickness and elemental composition of the measurement sample, respectively.

The calibration data is prepared prior to the measuring the sample and includes at least one pre-measured intensity value and/or at least one pre-measured angle of refraction corresponding to an x-ray beam transmitted through a comparison layer of known thickness and elemental composition. This pre-measured intensity and pre-measured angle of refraction are used as a reference for measurements of samples prepared with similar characteristics as the composite. The elemental composition and thickness characteristics of the known composite may be determined by one or more of the aforementioned techniques as described in the Background of the Invention. The method and system described herein may be used to obtain an intensity and angle of refraction of a transmitted x-ray beam emitted from the composite. The results may then be correlated to the corresponding film characteristics previously measured.

One of the more important advantages of the method and system as described herein is that many types of samples, including those with multiple elements and thicknesses, may be measured as long as a calibration standard is prepared in relation to the characteristics of the sample. This includes elements of both low and high atomic numbers. Moreover, the individual layers within samples may comprise one or more elements. In this embodiment, the entire composition of sample is measured and compared to calibration data corresponding to a known composite containing the same number of layers with equivalent compositions and thicknesses.

Alternatively, the system and method described herein may also comprise a computer readable storage medium including program instructions for simplifying the measurement of sample characteristics in a variety of manners. For example, the coordinate positions of the sample, incident x-ray beam and detector may be preprogrammed into the computer in order to acquire the desired positions in a fast and efficient manner. These positions are often predetermined from the establishment of the calibration data. Additionally, the comparison of the angles of refraction and intensity levels of the calibration data and measurement sample may be computed in a statistical process control (SPC) software program. The pre-measured intensity and pre-measured angle of refraction of the known composite relating to the calibration data may be used as target values. Preferably, a warning signal or alarm is activated if either the thickness or angle of refraction of the measurement sample is not within the allowed process parameters, which are preprogrammed into the SPC program.

Another embodiment of the system as described herein includes a stage on which to place the measurement sample. The stage is typically a platform configured for the size of the sample, however stages of a variety of shapes and sizes may be used. The stage may further include one or more openings wherein the section of the sample that emits the transmitted x-ray beam is not in contact with the stage. Therefore, the transmitted x-ray beam may pass through the opening to the detector without incurring additional refraction through the stage. It should be noted that the stage may have openings or may not have openings, but the pre-measured intensity and pre-measured angle of refraction values of the calibration data corresponding to a known composite should be measured with the same stage to account for the refraction of the x-ray beam through the stage.

Lastly, another embodiment of the method and system recited herein would allow for multiple measurements to be taken on one sample or a plurality of samples. This would increase the efficiency and production throughput of samples. Furthermore, a stage may be configured to hold multiple samples to further increase the productivity of the system and method. The positions of the incident x-ray beam, stage, and detector would vary upon the measurement of different locations and samples.

As noted above, the measurement sample typically used in the method and system as described herein is a semiconductor wafer. The advantages of this method and system include an easy and inexpensive manner in which to determine the thickness and composition of layers or thin films within the measurement sample. Furthermore, the system may be used within a semiconductor wafer fabrication area. It may additionally be included in the process sequence of the fabrication process. This benefit enables the process of semiconductor fabrication to be more efficient while improving reliability of the transistor through process control applications.

BRIEF DESCRIPTION OF THE DRAWINGS

Other objects and advantages of the invention will become apparent upon reading the following detailed description and upon reference to the accompanying drawings in which.

Figure 1:
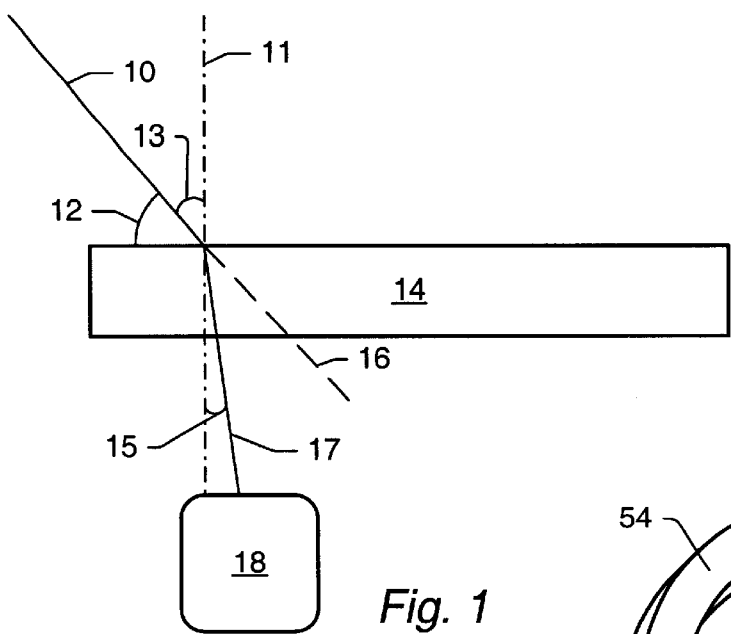
FIG. 1 is a cross-sectional view illustrating an embodiment of the method as described herein, wherein an incident x-ray beam is projected into a target sample with a resulting transmitted x-ray beam being collected by a detector.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

Turning to the drawings, FIG. 1 is an illustration of an embodiment of a method with which the thickness and elemental composition of a layer within sample 14 may be determined. As illustrated in the drawing, incident x-ray beam 10 is projected onto targeted sample 14 at angle 12, such that angle 12 refers to an angle relative to an exposed surface of sample 14. Sample 14 may consist of any device with the inclusion of a layer. For example, sample 14 may be a semiconductor wafer comprising a thin film at the upper surface of the wafer. Angle 12 may range from near 0 degrees to 90 degrees. However, shallow angles (i.e. <5 degrees) are typically used since they tend to produce a larger angle of refraction upon penetration through a sample as compared to that produced by an incident x-ray beam applied at a large angle relative to the sample. Upon transmission through sample 14, incident x-ray beam 10 refracts to a position of transmitted x-ray beam 17. Dashed line 16 extended from incident x-ray beam 10 shows the path of the incident x-ray beam without refraction. Angle 15 is referred to herein as the angle of refraction and refers to the angle at which transmitted x-ray beam 17 has refracted relative to normal line 11,which is perpendicular to a surface of sample 14. Angle 15 may vary 90 degrees, wherein the boundaries of the refraction are limited by the upper surface of sample 14 and normal line 11. In addition, it may be noted that angle 12 is complementary to angle 13, such that angle 13 may be the angle of incidence of incident x-ray beam 10. The angle of incidence 13 typically refers to the angle between incident beam 10 and perpendicular line 11.

Transmitted x-ray beam 17 may be collected by detector 18, wherein detector 18 is adapted to measure the intensity of transmitted x-ray beam 17 and angle of refraction 15. Typically, detector 18 comprises lithium-drifted silicon or sodium iodide silicon, but other suitable x-ray detector materials may be used. Detector 18 is preferably positioned on the opposite side of sample 14 from which incident x-ray beam 10 is impinged. The intensity of transmitted x-ray beam 17 and angle of refraction 15 are a function of the thickness and elemental composition of sample 14, respectively. Consequently, the intensity of transmitted x-ray beam 17 and angle of refraction 15 may be compared to calibration data (not shown) including intensities and angles of refraction resulting from measurement of comparison samples having layers of known thickness and composition. Such comparison to calibration data may be used to determine the thickness and elemental composition of layers within sample 14. The method and system as described herein may be capable of determining the elemental composition and thickness of each layer by the comparison to known samples having a similar number of layers and compositions. Analysis of multilayer samples may include changing the intensity at which incident x-ray beam 10 is projected. The variation in intensity may offer different or more information regarding the characteristics of a layer within a sample, especially for those that may be more complex (i.e., a sample comprising multiple layers and/or elements).

Figure 2:
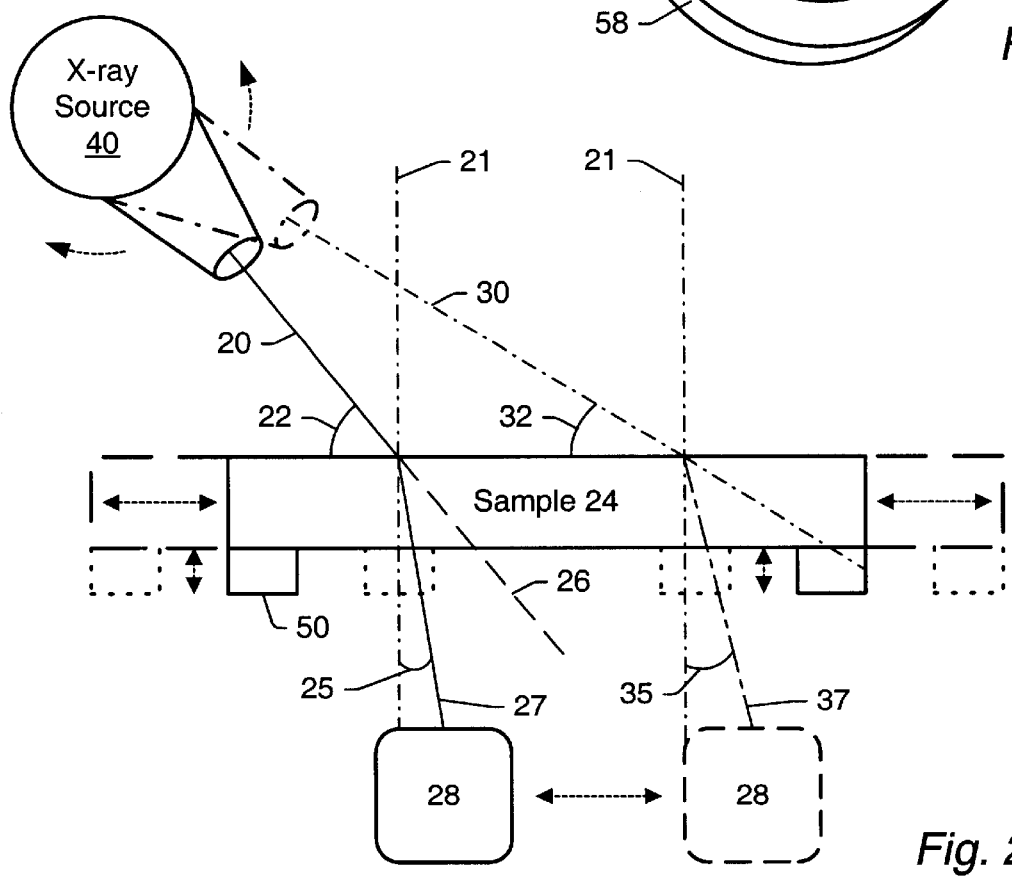
FIG. 2 is a cross-sectional view of an embodiment of a system suitable for implementing the system shown in FIG. 1, wherein the x-ray beam is projected from an incident x-ray source, the sample is placed on a stage, and the positions of the system's components are illustrated as being adjustable.

FIG. 2 illustrates an embodiment of a system for implementing the method of FIG. 1, wherein multiple possible configurations are illustrated. It should be noted that these configurations could be used separately or in combination with each other. As in FIG. 1, incident x-ray beam 20 is projected into sample 24 at angle 22. Transmitted x-ray beam 27 is collected by detector 28, which measures the intensity of transmitted x-ray beam 27 and angle of refraction 25. In the embodiment of FIG. 2, incident x-ray beam 20 is directed from x-ray source 40. X-ray source 40 may comprise a tungsten or molybdenum x-ray tube or in the embodiment of a low energy beam, x-ray source 40 may comprise of a rhodium x-ray tube in a vacuum.

The dashed lines around x-ray source 40 illustrate that a portion of the x-ray source may be adjusted to direct incident x-ray beam 30, for example, at angle 32 into sample 24. Thus, incident x-ray beam 30 is introduced into sample 24 at a shallower angle than incident x-ray beam 20. Incident x-ray beam 30 refracts to a position of transmitted x-ray beam 37 to produce angle of refraction 35. This new angle of refraction should be larger than angle of refraction 25, since, as noted previously, a shallower angle of impingement produces a larger angle of refraction. As in FIG. 1, the angle of refraction refers to the angle between the transmitted x-ray beam and line 21, which is normal (i.e. perpendicular) to the exposed surface of the sample. Thus, angles 25 and 35 may be described in relation to normal line 21. The arrows around x-ray source 40 indicate that the portion of the x-ray source may be positioned in either direction to produce a variety of angles in which to direct x-ray beams. Similarly, x-ray source 40 may be adjusted to direct an incident x-ray beam into sample 24 at an angle greater than angle 22, producing a smaller corresponding angle of refraction. Alternatively, the entire x-ray source 40 may be repositioned to obtain an angle at which to direct an incident x-ray. The latter alternative may offer greater flexibility in producing a desired angle. Furthermore, both options may be configured into the device for optimum flexibility. Similarly, the dashed lines and arrows around sample 24 and detector 28 indicate that the position of both of these components may be adjustable as well. These alternative embodiments offer greater flexibility in comprising a system in which to introduce an x-ray beam into sample 24 at different angles and having the corresponding transmitted x-ray beam collected by the detector. One or all three components may be moved in order to obtain the desired set-up. The system as described herein may be equipped with computer control capability in which the positions of each component are preprogrammed for a selected sample.

Also shown, in the embodiment of FIG. 2 is stage 50 on which sample 24 is placed. Preferably, stage 50 is laterally and vertically adjustable so that the position of sample 24 relative to incident x-ray beam 20 may be adjusted without having to move the sample itself. The stage, incident x-ray beam, and detector may all be adjustable for maximum flexibility of the system. However, it may be advantageous to place the x-ray source and incident x-ray beam at a fixed location and angle, respectively. The stage and detector may then be moved laterally in either direction, so that a plurality of measurements may be taken at the same angle along the sample. Such an analysis may determine the uniformity of a layer within the sample. Another benefit of this embodiment is that the programming of the component positions will be less complex than if the x-ray source was not fixed. A further embodiment may allow the adjustment of the angle at which the incident x-ray beam is directed, while the x-ray source remains in a fixed position. This embodiment would allow samples with a variety of thicknesses and compositions to be determined.

Figure 3:
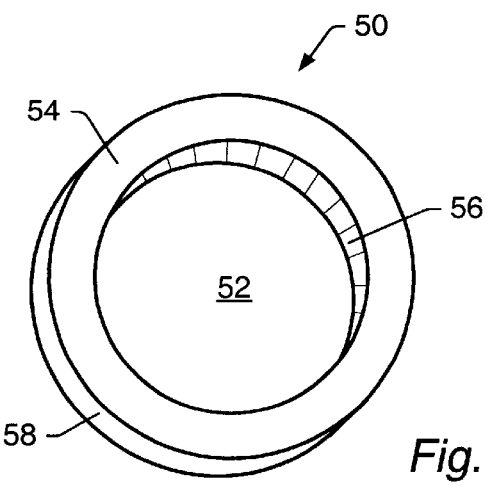
FIG. 3 is a top view of a stage configuration on which the sample of FIG. 2 has been placed.

The cross-sectional view of FIG. 2 shows stage 50 supporting sample 24 at the edges of sample 24. Alternatively, the stage may be configured to support sample 24 in a variety of manners. A possible stage configuration is illustrated in FIG. 3, showing the top view of stage 50 with structure 54 and opening 52 there through. Inner wall 56 and outer wall 58 illustrate that structure 54 is circular to support the outer edges of a sample, particularly a semiconductor wafer. Structure 54 may further include an additional inner wall and have a greater circumference than wall 56. This additional wall may be adjacent to the outer lateral edge of the sample, helping to hold it in place. Other attachment means, such as, vacuum openings or dips may also be used. Opening 52 is large enough to allow a transmitted x-ray beam to pass to a detector without having to pass through the stage. As previously suggested, the positions of an x-ray source, a sample, and a detector may be adjusted to insure the transmitted x-ray beam does not pass through the stage. An alternative configuration (not shown) would allow multiple openings. This configuration would typically be used when multiple samples are placed on the stage. Accordingly, the stage would have to be large enough to hold multiple samples.

Figure 4:
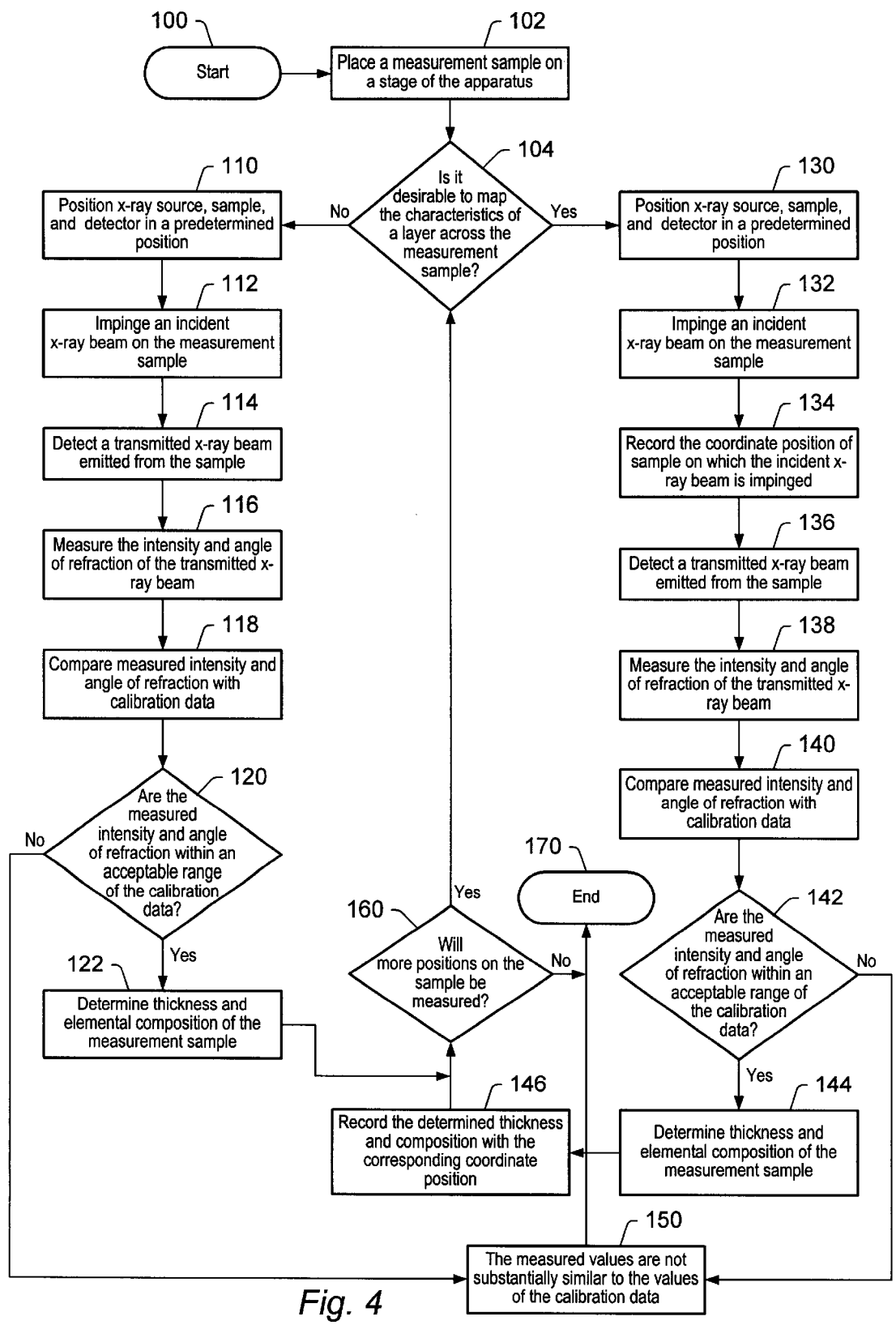
FIG. 4 is flow chart of an embodiment of the method as described herein.

Moving on to FIG. 4, a flowchart of an embodiment of the method as described herein is presented. The method is started at step 100 moving on to step 102, in which a measurement sample is placed on a stage of an apparatus as described in one embodiment of the case herein. Step 104 follows by determining if it is desirable to map the characteristics of a layer across the measurement sample. Both paths from step 104 follow similar process steps, except for additional steps that are included for mapping the characteristics of the layer within the sample. For example, both routes include steps 110 and 130 to position the x-ray source, sample, and detector in a predetermined position. This predetermined position may be established during the preparation of the calibration standard and programmed into the apparatus so that the desired positions may be acquired in a fast and efficient manner. Alternatively, the predetermined positions may be selected through an additional step to the method described in the embodiment illustrated in FIG. 4, preferably previous to steps 110 and 130. A plurality of positions for the x-ray source and sample may exist in which to acquire a desired angle of impingement of the incident x-ray beam and therefore, a plurality of positions may exist for the detector to insure the proper position to collect the transmitted x-ray beam.

FIG. 4 continues to steps 112 and 132, in which an incident x-ray beam is impinged onto the measurement sample. At this point, the route that is mapping the layer characteristics across the measurement sample includes an additional step. Step 134 follows step 132 and records the coordinate position of the sample on which the incident x-ray beam is impinged. The incident x-ray beam passes through the sample and refracts to the position of the transmitted x-ray beam. Both paths of the method as illustrated in FIG. 4, detect the transmitted x-ray beam emitted from the sample in steps 114 and 136. The intensity and angle of refraction of the transmitted x-ray beam is then measured in steps 116 and 138. Steps 118 and 140 of both routes include comparing the measured intensity and angle of refraction with calibration data. Steps 120 and 142 follow to determine whether the measured intensity and angle of refraction is within an acceptable range of the calibration data. The acceptable range can be determined by the process parameters needed for the functionality of the sample relative to its layer characteristics. In the case in which the measured values are not within an acceptable range, step 150 follows for both process routes and states that the measurement sample is not substantially similar to the values of the calibration data. Step 150 proceeds to the termination step 170. In the case in which the measured values are within an acceptable range, steps 122 and 144 follow to determine the thickness and elemental composition of the measurement sample. At this point, the route that is mapping the characteristics of the layer across the measurement sample proceeds to step 146 to record the determined thickness and composition with the corresponding coordinate position. Step 160 follows steps 122 and 146 to determine if more positions will be measured on the sample. The process is rerouted to step 104 in the event that additional measurements are taken. Alternatively, termination step 170 follows and completes the method.

It should be noted that the method as illustrated in FIG. 4 is an embodiment of the method as described herein. Many other embodiments may exist. For example, the method could include only incorporating the process in which to determine thickness of a layer within a sample or alternatively, only the composition of the sample. Other alternative embodiments may include, but are not limited to measuring multiple samples or varying the angle of impingement and preset intensity of the incident x-ray beam.

It is important that similar parameters and conditions be used in the application and analysis of both the known composite and sample. For example, the same type and thickness of substrate should be used. Furthermore, the angle of impingement and intensity of the incident x-ray beam used for both measurements should be duplicated. On the contrary, the thickness and elemental composition should be similar, but do not have to be identical. The measured intensity and angle of refraction of the sample should be within a narrow range of the calibration data, so that an approximation can be made from a linear extrapolation. The measured intensity and angle of refraction of the sample are first compared to the calibration data and their corresponding thickness and composition characteristics. The measurements of the sample are then extrapolated from the calibration data to obtain thickness and elemental composition measurements for the sample. A linear relationship is assumed since the allowed measurements are within a narrow range of each other. In another embodiment, an alternative correlation (i.e. exponential) may be assumed, however multiple of measurements with varying thicknesses and compositions would have to be collected in order to determine the plot of the correlation. Finally, a determination can be made as to whether a layer is within specification of its preset process parameters. Typically, the known composite is selected from a transistor of optimum performance, so that acceptable process parameters may be assigned above or below its characteristics.

It will be appreciated by those skilled in the art having the benefit of this disclosure that this invention is believed to provide a method and system for determining the thickness and elemental composition of a layer within a sample. Furthermore, the invention may be incorporated into a fabrication area of the layering application. More specifically, the analysis of a thin film on a semiconductor wafer may be processed within the semiconductor fabrication area or process.

Furthermore, it is also to be understood that the form of the invention shown and described above is to be taken as exemplary, presently preferred embodiments. Various modifications and changes may be made without departing from the spirit and scope of the invention as set forth in the claims. It is intended that the following claims be interpreted to embrace all such modifications and changes.

What is claimed is:

1. A method for analyzing a layer within a measurement sample, wherein said method comprises:
    impinging an incident x-ray beam on an exposed surface of said measurement sample;
    detecting a transmitted x-ray beam emerging from the sample, wherein the transmitted x-ray beam comprises a portion of the incident x-ray beam passing through the layer; and
    comparing an intensity of said transmitted x-ray beam to calibration data, wherein said calibration data comprises a pre-measured intensity of an x-ray beam transmitted through a comparison layer of known thickness.

2. The method as recited in claim 1, wherein said incident x-ray beam is oriented at an angle relative to said exposed surface, and wherein said angle is less than 90 degrees and greater than 0 degrees.

3. The method as recited in claim 2, wherein said angle is less than 5 degrees.

4. The method as recited in claim 1, further comprising comparing an angle of refraction to said calibration data, wherein the calibration data further comprises a premeasured angle of refraction, and wherein said angle of refraction is a measurement of an angle between the transmitted x-ray beam and a line perpendicular to said exposed surface.

5. The method as recited in claim 4, wherein said angle of refraction is a function of the elemental composition of said layer, and wherein said intensity is a function of the thickness of said layer.

6. The method as recited in claim 1, wherein said layer comprises a plurality of elements.

7. The method as recited in claim 1, wherein said impinging comprises impinging a plurality of different incident x-ray beam intensities.

8. The method as recited in claim 1, wherein said method is conducted within a semiconductor fabrication environment.

9. The method as recited in claim 1, wherein said method is part of a sequence within a semiconductor wafer fabrication process.

10. The method as recited in claim 1, further comprising taking a plurality of measurements along said exposed surface.

11. A method for analyzing a layer within a measurement sample, wherein said method comprises:
    impinging an incident x-ray beam on an exposed surface of said measurement sample;
    detecting a transmitted x-ray beam emerging from the sample, wherein the transmitted x-ray beam comprises a portion of the incident x-ray beam passing through the layer; and
    comparing an angle of refraction of said transmitted x-ray beam to calibration data,
    wherein said calibration data comprises a pre-measured angle of refraction, and
    wherein said angle of refraction is a measurement of an angle between the transmitted x-ray beam and a line perpendicular to said exposed surface.

12. The method as recited in claim 11, wherein said pre-measured angle of refraction corresponds to an x-ray beam transmitted through a comparison layer of known composition.

13. An apparatus for analyzing a layer within a measurement sample, wherein said apparatus comprises:
    an x-ray source adapted to produce an incident x-ray beam;
    a detector adapted to collect a transmitted x-ray beam; and
    calibration data comprising a pre-measured angle of refraction and a pre-measured intensity.

14. The apparatus as recited in claim 13, wherein said detector is adapted to measure an intensity of the transmitted x-ray beam, and wherein said detector is further adapted to determine an angle of refraction associated with the transmitted x-ray beam relative to a line perpendicular to a surface of said sample.

15. The apparatus as recited in claim 13, further comprising computer readable storage medium including program instructions for tracking said angle of refraction and said intensity, wherein said program instructions use said pre-measured angle of refraction and said pre-measured intensity as target values.

16. The apparatus as recited in claim 15, wherein said program instructions are adapted to determine a thickness of the layer as a function of intensity, and wherein said program instructions are further adapted to determine an elemental composition of the layer as a function of angle of refraction.

17. The apparatus as recited in claim 13, wherein said apparatus is placed within a semiconductor fabrication area.

18. An apparatus for analyzing a layer within a semiconductor wafer, wherein said apparatus comprises:
- an x-ray source adapted to produce an incident x-ray beam;
- a detector adapted to collect a transmitted x-ray beam;
- a stage on which to orient the semiconductor wafer; and
- a computer readable storage medium comprising program instructions adapted to determine a thickness of the layer as a function of intensity of the transmitted x-ray beam.

19. The apparatus as recited in claim 18, further comprising computer readable storage medium including program instructions for controlling positions of said x-ray source, said stage, or said detector, wherein said positions are adjustable.

20. The apparatus as recited in claim 18, wherein said stage comprises at least one opening, wherein said transmitted x-ray beam passes through said opening.

21. The apparatus as recited in claim 18, wherein said detector is adapted to measure the intensity of the transmitted x-ray beam, and wherein said detector is further adapted to determine an angle of refraction associated with the transmitted x-ray beam and a line perpendicular to a surface of said wafer.

22. The apparatus as recited in claim 21, wherein said program instructions are further adapted to determine an elemental composition of the layer as a function of the angle of refraction.

* * * * *